Aug. 11, 1925. 1,549,319
F. LÖSEL
BACK PRESSURE TURBINE AND METHOD OF UTILIZING
HIGH PRESSURE STEAM IN TURBINES
Filed Aug. 13, 1924
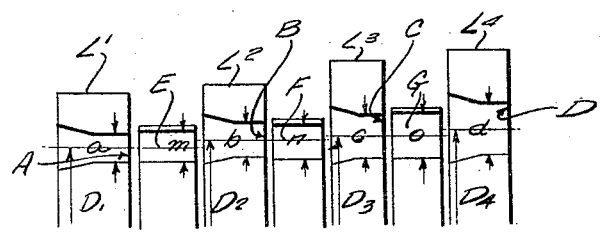
INVENTOR
Franz Lösel
BY Richard Eyre
ATTORNEY Patented Aug. 11, 1925.

1,549,319

UNITED STATES PATENT OFFICE.

FRANZ LÖSEL, OF BRUNN, CZECHOSLOVAKIA.

BACK-PRESSURE TURBINE AND METHOD OF UTILIZING HIGH-PRESSURE STEAM IN TURBINES.

Application filed August 13, 1924. Serial No. 731,721.

*To all whom it may concern:*

Be it known that I, FRANZ LÖSEL, a citizen of the Czechoslovakia Republic, residing at Brunn, have invented new and useful Improvements in Back-Pressure Turbines and Methods of Utilizing High-Pressure Steam in Turbines, of which the following is a specification.

This invention relates to high pressure especially high pressure back pressure steam turbines of the multi-stage disc wheel type and particularly turbines of this character having full admission.

In my Letters Patent #1,494,850, May 20, 1924, I have set forth a steam turbine of a construction to operate within a distinctly lower zone of relative steam velocities than was hitherto thought efficient or practical, namely relative velocities within the rotating blades not exceeding 140 meters per second in any stage of the high pressure portion of the turbine. This patent is based on the discovery by me that the low velocity zone defined by 140 meters per second relative velocity as the upper limit is substantially more efficient than the higher velocity zones employed by certain turbines builders and particularly as applied to turbines having impulse characteristics. I have also found that a still greater efficiency may be had and more satisfactory turbine performance may be obtained by so constructing the turbine parts as to obtain relatively low absolute velocities throughout the turbine as well as low relative velocities. For example, I have found that at absolute velocities of 200 meters per second the efficiency begins to substantially decrease and that best performance is had at absolute velocities lower than 200 meters. I therefore so devise and proportion the succeeding stationary guide nozzles as to come within certain predetermined relative ratio limits and preferably such ratio limits combined with such peripheral velocity of the rotor as to secure full advantage from the low relative velocity zone operation defined in my above patent. These nozzle proportion limits within which the stationary guide nozzles must come are defined as to the permissible upper limit by the value 1.25, this being the limit ratio of any following guide nozzle exit area to the next preceding nozzle exit, and of course this ratio must be greater than unity. I mean by "guide nozzle exit" the total exit section of all the orifices or nozzle outlets of a stage. The most efficient and satisfactory guide nozzle ratio for turbines built by me for practical use is less than 1.25, it having been found that the efficiency has already begun to decrease when this upper limit is reached, and decreases very rapidly as this ratio is increased above 1.25. The most efficient and best turbine performance is obtained when such guide nozzle ratio is substantially uniform throughout the turbine and a uniform expansion of the steam is thereby effected throughout the turbine, with consequent substantial reduction of hydraulic and other internal losses, but practically such uniformity is not essential and it is generally sufficient that the guide nozzle ratios be chosen for best overall efficiency and performance with due regard to the practicable manufacture thereof but in no instance shall such a ratio exceed 1.25 found by me to be the maximum limit beyond which best performance may not be had.

My present invention is particularly applicable to turbines of the disc wheel type and I have diagrammatically illustrated in the embodiment exhibited in the drawings a turbine of this type. Referring to the drawings, I have diagrammatically illustrated only the first three stages of a multistage turbine embodying my invention and consisting of the succeeding guide means or stationary guide nozzle carriers $L^1$, $L^2$, $L^3$ and $L^4$, the guide nozzle exit orifices A, B, C and D and the pitch diameters of the guide nozzles $D^1$, $D^2$, $D^3$ and $D^4$, where A, B, C, D represent the total exit sections or areas of all the nozzles carried respectively by the carriers $L^1$, $L^2$, $L^3$ and $L^4$. The nozzle orifice heights at their exits of minimum area sections are indicated by $a$, $b$, $c$ and $d$. The rotating wheels or bucket carriers are also indicated diagrammatically and have the rotating nozzles or canals E, F, and G disposed in alinement with the stationary nozzles. $m$, $n$ and $o$ are the heights of the rotating wheel canals.

My present invention resides, as above indicated, in so proportioning the expanding nozzles A, B, C and D with reference to each other as to obtain peculiar and marked efficiencies in turbine operation and performance and preferably at the same time securing the low relative steam velocity flow through the rotating canals E, F and G described and defined in my patent above indicated. To effect this purpose I have found that the nozzle ratios throughout the turbine shall not exceed 1.25, including the ratio $\frac{B}{A}$ of the second stage to the first stage of the turbine. It is particularly important that these ratios do not exceed 1.25 in the highest pressure portion of the turbine, and preferably this restriction should apply throughout the high pressure part of the turbine. For the best and most satisfactory performance the nozzles A, B, C and D should increase in dimensions gradually and uniformly from the first stage A to and through all high pressure stages of the turbine so as to obtain a uniform unimpeded steam expansion and working throughout the turbine, but as indicated above strict uniformity may be departed from in the practical construction of turbines without sacrificing the main purpose and advantages of my invention. The preferred ratios, while not greater and usually less than 1.25, depend upon the circumstances and conditions of each individual case including that of pressure, and with pressures sufficiently high it may be desirable to proportion the nozzles so as to have ratios as low as and even lower than 1.12.

For example the following ratios of the guide means exit sections under the conditions indicated may be employed to advantage:

Steam conditions 100 atm., 400° C., wheel diameter 400 mm., a ratio of 1.038,

Steam conditions 70 atm., 400° C., wheel diameter 400 mm., a ratio of 1.042,

Steam conditions 30 atm., 300° C., wheel diameter 400 mm., a ratio of 1.087.

The limit ratio 1.25 is somewhat greater than the largest value which is used in keeping the relative velocity below 140 m/sec. Therefore it will also be practicable to increase the mentioned values by about 5%, and these ratios would then become approximately 1.089 instead of 1.038, 1.094 instead of 1.042, etc.

Since the areas of the guide nozzles are proportional to the heights $a$, $b$, $c$ and $d$, for full admission turbines where the admission arc is a circle the ratios or proportions $$\frac{B}{A}, \frac{C}{B}, \frac{D}{C}$$

may be expressed thus:

$$\frac{b \times D_2}{a \times D_1}, \frac{c \times D_3}{b \times D_2}, \frac{d \times D_4}{c \times D_3}$$

etc., where $D_1$, $D_2$, $D_3$ and $D_4$ are the respective pitch diameters of the guide nozzles A, B, C and D and are proportional to the admission arc lengths. These latter formulæ may therefore be employed in choosing the desired ratio between any two adjacent guide nozzles, care being exercised at all times to avoid a ratio or proportion greater than 1.25 and preferably less than this ratio. Full admission is necessary for obtaining the best turbine performance and highest efficiency, especially for turbines of large capacity, but for turbines of smaller output it may happen in certain cases that with full admission and if the relative velocity is kept within the limit of 140 m/sec. the canal or nozzle heights become so small as to render the practical construction thereof difficult if not impossible. In such a case I prefer to use partial admission instead of full admission. For partial admission turbines the admission arc forms only a portion of the complete circle and accordingly the partial admission arc factor should be applied to the above mentioned ratios and equation. When the admission arc factors of the succeeding guide stages are signified by $\alpha$, $\beta$, $\gamma$, etc., in percentages of the whole circle there results then the following equation for the condition of the upper limit of 140 meters per second relative velocity as follows:

$$\frac{b \times \beta \times D_1}{a \times \alpha \times D} = \frac{c \times \gamma \times D_2}{b \times \beta \times D_1} \cdots \leqq 1.25$$

For full admission the factors $\alpha$, $\beta$, $\gamma$, etc. become 100% or unity and the formulæ may be written as described above. The ideal efficiency and performance are more nearly approached when the succeeding ratios of adjacent nozzles are somewhat below 1.25 and when the relative velocity within the rotating canals E, F and G are well below 140 meters per second, and especially the higher the steam admission pressure the lower should be the velocity in the first stages, and consequently the smaller the ratios. It is essential, therefore, for best performance, that not only should an upper limit be placed upon the ratios of adjacent guide nozzles (and therefore the absolute velocity), but also that the peripheral velocity of the turbine wheel and the absolute velocity (as determined by the guide nozzle ratios) shall be so chosen as to obtain a relative steam velocity within the rotating canals which comes well within the low velocity but highly efficient zone which characterizes the applicant's turbine constructions. For example best performance and efficiency is obtained in certain cases when the absolute velocity of the steam is below 150 m/sec.

It is also desirable that the ratios $\frac{n}{m}$, $\frac{o}{n}$ etc. of succeeding rotating canal areas shall not exceed 1.25, corresponding to the limit ratios of the guide nozzles.

As above indicated my invention is particularly directed to turbines of the disc wheel type and by which I mean turbines in which the impulse characteristics predominate over the reaction characteristics.

Having thus described my invention what I claim and desire to protect by Letters Patent is:

1. A multistage high pressure steam turbine of the disc wheel type having its guide nozzles so proportioned as to obtain absolute velocities not exceeding 200 meters per second in any stage.

2. A multistage high pressure steam turbine of the disc wheel type having its guide nozzles so proportioned as to obtain absolute velocities not exceeding 200 meters per second in any stage and in which the relative velocities do not exceed 140 meters per second in any rotating canal.

3. A multistage high pressure steam turbine of the disc wheel type, in which the ratio of the exit section of all the guide nozzles of a guide means to the corresponding exit section of all the guide nozzles of the next preceding guide means in any part of the high pressure end of the turbine is below 1.25.

4. A multistage high pressure steam turbine of the full admission multistage disc wheel type in which the ratio of the product of the height of the nozzle orifice of any guide means and its average pitch diameter to the corresponding product of the next preceding guide means is not greater than 1.25 throughout the whole turbine.

5. A multistage high pressure steam turbine of the multistage disc wheel type of the character set forth in claim 3 in which the proportion between succeeding guide nozzle canal exit sections of the guide means is substantially constant throughout the whole turbine.

6. A multistage high pressure disc wheel steam turbine of the character set forth in claim 4 in which the proportion chosen for two succeeding guide canal exit sections is kept constant throughout the whole turbine including the first or highest pressure stage thereof.

7. A multistage high pressure steam turbine of the disc wheel type of the character set forth in claim 2 in which the ratio of the exit section of the canals of a rotating wheel in the corresponding exit section of the next preceding rotating wheel canals does not exceed 1.25 throughout the whole turbine.

8. A multistage high pressure disc wheel turbine of the character set forth in claim 3 in which the ratio of the exit section of the canals of a rotating wheel to the corresponding exit section of the next preceding rotating wheel canals does not exceed 1.25 throughout the whole turbine, and wherein the proportion chosen for two succeeding rotating wheel canals exit sections is maintained substantially constant throughout the whole turbine.

9. A high pressure steam impulse turbine of the full admission type in which the guide nozzles before and behind the first rotating wheel are so constructed and dimensioned as to give an absolute velocity below 200 meters per second and in which the relative velocity is below 140 meters per second in the canals in the first rotating wheel and these velocity values are not surpassed in any subsequent stage.

10. A multistage high pressure steam turbine of the impulse type having its guide nozzles and rotating canals of the first and succeeding high pressure stages so constructed and proportioned as to obtain absolute and relative steam velocities less than 200 and 140 meters per second respectively throughout.

11. A multistage high pressure steam turbine of the disc wheel type in which the ratio of the product of canal height and admission arc of a guide stage to the corresponding product of the next preceding guide stage does not exceed the value of 1.25.

In testimony whereof, I have signed my name to this specification.

FRANZ LÖSEL.

Witnesses:
 OMT. BREMAN,
 F. KNOTEK.